(12) United States Patent
Durairaj et al.

(10) Patent No.: US 12,105,784 B1
(45) Date of Patent: *Oct. 1, 2024

(54) SECURE BIOMETRIC-BASED SMART CARD ACTIVATION METHOD AND SYSTEM

(71) Applicant: UIPCO, LLC, San Antonio, TX (US)

(72) Inventors: Ravi Durairaj, San Antonio, TX (US); Gregory Brian Meyer, San Antonio, TX (US); Oscar Roberto Tijerina, San Antonio, TX (US); Sean Carl Mitchem, San Antonio, TX (US); Stacy Callaway Huggar, San Antonio, TX (US); Ruthie D. Lyle, Durham, NC (US); Nathan Lee Post, Rockport, TX (US); Mark Anthony Lopez, Helotes, TX (US); Nolan Serrao, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,754

(22) Filed: Sep. 19, 2023

Related U.S. Application Data

(63) Continuation of application No. 17/219,140, filed on Mar. 31, 2021, now Pat. No. 11,836,232.

(60) Provisional application No. 63/002,900, filed on Mar. 31, 2020.

(51) Int. Cl.
*G06F 21/32* (2013.01)
*G06F 21/34* (2013.01)
*G06V 40/16* (2022.01)

(52) U.S. Cl.
CPC .............. *G06F 21/32* (2013.01); *G06F 21/34* (2013.01); *G06V 40/162* (2022.01); *G06V 40/175* (2022.01)

(58) Field of Classification Search
CPC ....... G06F 21/32; G06F 21/34; G06V 40/162; G06V 40/175
USPC ......................................................... 713/186
See application file for complete search history.

(56) References Cited

U.S. PATENT DOCUMENTS

| 7,039,221 B1 * | 5/2006 | Tumey ..................... G07C 9/37 382/118 |
| 10,970,953 B2 * | 4/2021 | Tulsidas ............... G06V 10/993 |
| 11,301,554 B2 * | 4/2022 | Law ......................... G06F 21/34 |
| 2009/0191846 A1 * | 7/2009 | Shi ...................... H04L 63/0861 455/411 |

(Continued)

OTHER PUBLICATIONS

Notice of Allowance mailed Jul. 25, 2023 for U.S. Appl. No. 17/219,140.

*Primary Examiner* — Samson B Lemma
(74) *Attorney, Agent, or Firm* — Plumsea Law Group, LLC

(57) ABSTRACT

A method and system of performing an authentication of a person in order to activate a smart card for access to a secured resource is disclosed. The system and method are configured to collect image data and compare the image data to facial model data stored on the smart card. The system detects whether there is a match between the image data and any facial signatures previously collected and stored in the smart card. If there is a match, the system verifies an identity of the person and can be configured to automatically activate the smart card for a limited period of time.

16 Claims, 10 Drawing Sheets

(56) References Cited

U.S. PATENT DOCUMENTS

| | | | |
|---|---|---|---|
| 2014/0317715 A1* | 10/2014 | Conner | G06K 19/07354 |
| | | | 726/7 |
| 2017/0011368 A1* | 1/2017 | Trombino | G06Q 20/20 |
| 2019/0286805 A1* | 9/2019 | Law | G06F 21/34 |
| 2019/0303551 A1* | 10/2019 | Tussy | G06Q 20/3276 |
| 2021/0264135 A1* | 8/2021 | Whitelaw | G06V 10/25 |
| 2022/0147605 A1* | 5/2022 | Tussy | G06F 21/32 |
| 2022/0147974 A1* | 5/2022 | Law | G06F 21/34 |

* cited by examiner

SECURE BIOMETRIC-BASED SMART CARD ACTIVATION METHOD AND SYSTEM

CROSS-REFERENCE TO RELATED APPLICATION

This application claims the benefit of U.S. Provisional Patent Application Ser. No. 63/002,900 filed on Mar. 31, 2020 and titled "Secure Biometric-Based Smart Card Activation Method and System", and U.S. patent application Ser. No. 17/219,140 filed on Mar. 31, 2021 and titled "Secure Biometric-Based Smart Card Activation Method and System", the disclosures of both of which are incorporated by reference herein in their entirety.

TECHNICAL FIELD

The present disclosure generally relates to the temporary activation of a credit or debit card following a biometric-based authentication of authorized persons, and specifically to a method and system for authentication and authorization of persons for granting use of financial resources or other secured services, features, and resources based on a biometric-based signal associated with the user.

BACKGROUND

Financial institutions provide credit cards and debit cards to consumers to enable consumers to access credit and/or money on account. However, fraud and theft are problems associated with such cards. Financial institutions, such as banks and credit card companies, have financed numerous efforts to combat fraud. However, such efforts have had limited success. Identity theft, credit or debit card misuse, fraud and other racketeering schemes cost businesses and individual thousands of dollars in losses. In addition to the money lost to criminals, individuals suffer losses in the form of lost wages and time rectifying the situation and higher interest rates due to credit rating issues that result from the fraud perpetrated in their name. Generally, identity or credit theft refers to a phenomenon where a first party poses as a second party by using information or objects associated with a second party to commit a fraudulent act with a third party. The third party believes that the first party is who they claim to be because they are using information or objects that generally would only be known by the second party. A common solution to preventing identity theft is the use of authentication credentials that prove the identity of the user.

Some financial institutions have attempted to thwart fraudulent activities through technology, customer awareness, insurance, and the like. For example, efforts employed by financial institutions include safeguards like account PIN numbers and CVV2 numbers on credit cards on the usage side, and detection methods like neural net pattern checking, fraud databases, and the like, on the investigative side. While all these efforts are helpful the fact remains that the pattern of financial crimes continues. These threats affect not only the financial industry, but all aspects of commercial and consumer activities.

In most scenarios in which an end-user attempts to access a secured resource via one or more of these channels, the end-user will be required to provide some proof of identity, typically associated with an identification card, key-card, fingerprint, or other factor before access is granted. Authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or offer unique identification factors.

There is a need in the art for a system and method that addresses the shortcomings discussed above.

SUMMARY

In one aspect, a method of activating a smart card is disclosed. The method includes receiving, via an image sensor of the smart card, first image data corresponding to a first facial signature, and comparing the first facial signature to a first facial model stored in a memory of the smart card. The method further includes determining the first facial signature and the first facial model match, and activating, in response to determining the first facial signature and the first facial model match, the smart card for a first period of time.

In another aspect, a system for activating a smart card includes a processor and machine-readable media. The machine-readable media include instructions which, when executed by the processor, cause the processor to receive, via an image sensor of the smart card, first image data corresponding to a first facial signature and compare the first facial signature to a first facial model stored in a memory of the smart card. The instructions also cause the processor to determine the first facial signature and the first facial model match, and activate, in response to determining the first facial signature and the first facial model match, the smart card for a first period of time.

In another aspect, a smart card configured to verify that a user of the smart card is authorized to use the smart card includes a holographic rendering corresponding to a representation of a first facial signature, an integrated circuit chip, at least a first processor configured to detect facial signatures and compare the detected facial signatures to the first facial signature, and a battery.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
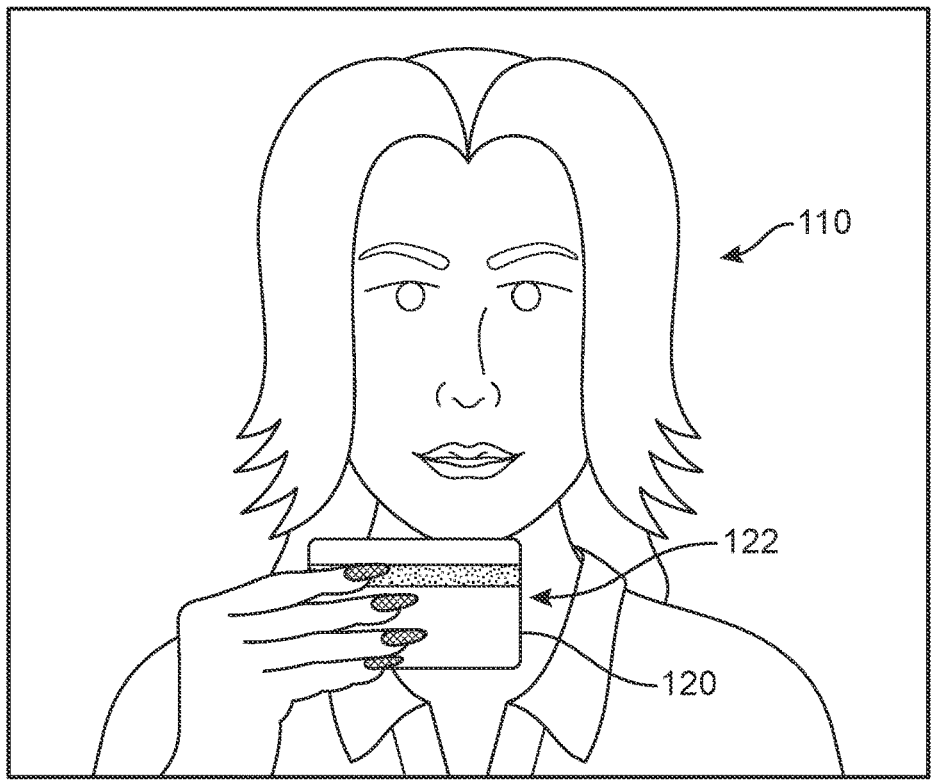
FIGS. 1 and 2 depict a scenario in which a smart card is activated after authentication of a user based on facial recognition, according to an embodiment.

The embodiments provide a method and system for allowing smart card users to activate and utilize their smart cards in a more secure and more efficient manner. As described in greater detail below, a touchless and passive authentication process and system may be utilized for reducing and in some cases eliminating the need for users to present credentials, input passwords, or otherwise offer identity tokens or factors. In addition, the proposed system and process can reduce and even eliminate fraudulent usage of a smart card. The proposed system takes advantage of the increasing miniaturization of various technologies as well as the application of computing resources to record and identify unique characteristics in an individual's biometric data. Specifically, the proposed smart card includes a conditional activation process by which the card may only be used, enabled, or "activated" if a particular facial signature is received. A user faces toward the sensor embedded in his or her card and the card is temporarily activated if the user's facial signature matches the machine-learning model stored in memory on the card (hereinafter referred to as a facial signature model, or more simply a facial model) thereby preventing unauthorized persons from using the card. This process takes advantage of holographic imaging and facial recognition technology to provide a powerful alternative to traditional authentication methods that have relied on touch-based sensors, passcodes, or physical objects (swipe cards, wearable tokens). As will be discussed below, the proposed systems can further be configured to verify a card user's identity with minimal user effort and offer a simplified, efficient, and ultimately highly convenient process by which to authorize and grant the user the ability to access the secured resources linked to the smart card. For example, while a PIN code can be shared by the genuine cardholder, biometric data cannot. This type of identification and authentication approach brought by biometry can be used by card issuers to ensure that the card usage benefits are really used by the genuine cardholder, removing a large source of fraudulent transactions.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. Security systems use this identity when determining if a subject can access an object. In addition, the term authentication refers to the process of proving (or verifying) an identity, and typically occurs when subjects provide appropriate credentials to prove their identity. For example, when a user provides the correct password with a username, the password proves that the user is the owner of the username. Thus, the authentication provides proof of a claimed identity. As a general matter, three main methods of authentication include (a) user knowledge, such as a password or PIN; (b) user possession, such as a key, smart card, CAC (Common Access Card), PIV card (Personal Identity Verification card), RSA, or other card or token, magnetic stripe cards, certificates with a digital signature, etc.; and (c) biometric factors, such as facial recognition, voice recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "touchless" refers to the concept of a system and method that is not dependent on contact from a person or presentation of tangible (physical) factors.

In addition, the use of the term "smart card", also known as a chip card, or integrated circuit card (ICC), refers to a physical electronic authorization device, used to control access to a resource. In some embodiments, a photonic integrated circuit (PIC) may be used, which use light instead of electrons to function. PICs offer numerous advantages over conventional circuits including higher speed, greater bandwidth, and lower energy loss. The smart card is typically a plastic credit card-sized card with an embedded integrated circuit (IC) or PIC chip. Some smart cards can include a pattern of metal contacts to electrically connect to the internal chip. Others are contactless, and some are both. Smart cards can provide personal identification, authentication, data storage, and application processing. A few such applications include identification, financial, mobile phones (SIM), public transit, computer security, schools, and healthcare. Smart cards may provide strong security authentication for single sign-on (SSO) within organizations. A smart card may include one or more of the following general characteristics: (a) dimensions similar to those of a credit card (i.e., ID-1 of the ISO/IEC 7810 standard defines cards as nominally 85.60 by 53.98 millimeters (3.37 in×2.13 in) or ID-000, which is nominally 25 by 15 millimeters (0.98 in×0.59 in) (commonly used in SIM cards), where both include a thickness of approximately 0.76 millimeters (0.030 in); (b) contains a tamper-resistant security system (for example a secure cryptoprocessor and a secure file system) and provides security services (e.g., protects in-memory information); (c) can communicate with external services through card-reading devices, such as ticket readers, ATMs, DIP reader, etc.; (d) typically made of plastic, generally polyvinyl chloride, but sometimes polyethylene-terephthalate-based polyesters, acrylonitrile butadiene styrene or polycarbonate.

Thus, it may be understood that use of the term "smart card" includes credit cards and debit cards, or other cards that typically include an account number displayed or accessible on one surface of the card and a magnetic strip on the opposite surface and/or a chip. As a general matter, the term "credit card" should be understood to encompass credit and charge cards (MasterCard®, Visa®, American Express®, etc.), debit cards such as those usable at ATMs and many other locations or that are associated with a particular account, gift cards, identification cards (such as a driver's license, student ID, library card, identification card, etc.), and various hybrids thereof that may be used to purchase goods and services or to allow access to the same, and/or provide identification.

Furthermore, the term "passive" refers to the concept of a system and method that is not dependent on any particular 'active' interaction of a person with a device resulting from a change in the person's normal activity or behavior. In other words, walking and moving from one location to another are passive interactions, as the person would perform these activities regardless of the authentication system that is in place. However, other user actions, such as but not limited to providing a voice command, passcode, carrying and presenting an additional identification credential or token, contact-based fingerprint scans, etc. are active inputs and a system requiring any of these types of information would not be considered passive.

In addition, references to an activation, enabling, active mode, or transactional mode for a smart card refers to the outcome of a successful authentication of a user which triggers the activation of the card for a pre-defined period of time. Once that period of time expires, unless the user re-authenticates their identity, the card will be disabled or deactivated again.

It may be appreciated that conventional methods of authentication rely heavily on identification documents or other tangible items that users are required to carry on their person and present when prompted. However, physical tokens that do not include additional biometric-based verification have significant shortcomings. For example, they can be lost, stolen, or forged. In many cases, an individual may need to carry multiple identification cards or tokens, which may be unwieldy. Furthermore, less tangible factors can be burdensome, requiring memorization or physical contact or a particular physical position or proximity with a device. The following systems describe a process of authentication that does not rely on tangible factors or changes in behavior by a user while significantly increasing card security.

Figure 2:
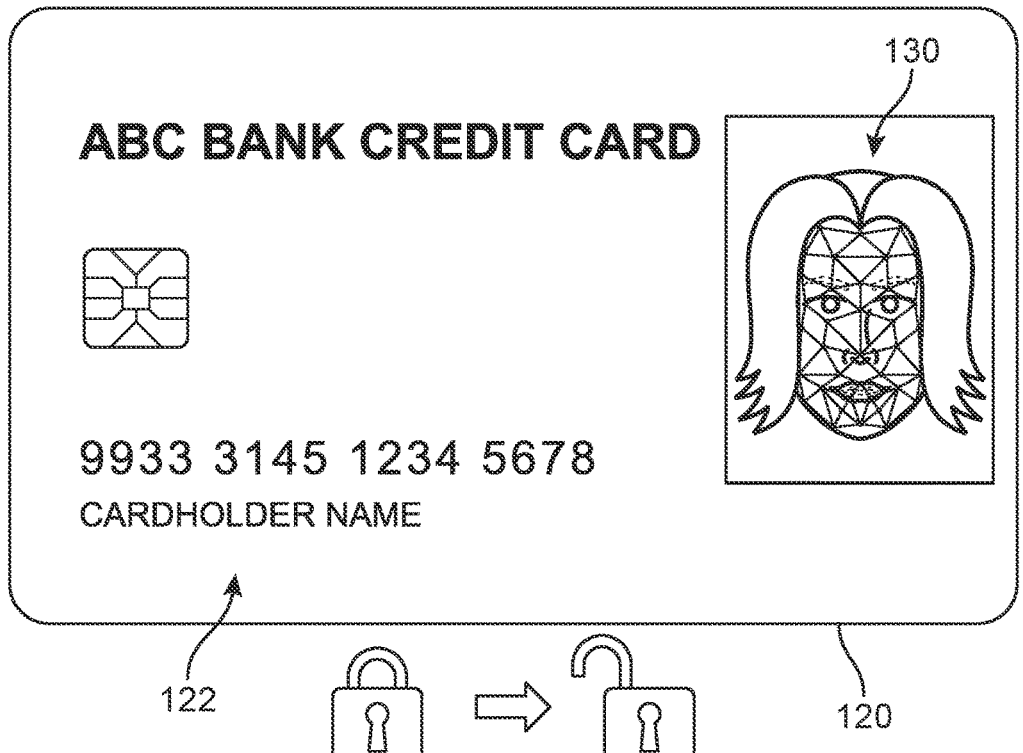

For purposes of clarity, an overview of one embodiment of the proposed systems and methods is illustrated with reference to FIGS. 1 and 2. In FIG. 1, a first user 110 is shown holding a first smart card ("first card") 120 and facing toward an input-receiving first side 122 of the first card 120, here being an opposite-facing side of the side on which a magnetic stripe is provided. In general, the first card 120 may be sized and dimensioned with a rectangular shape. In some embodiments, the first card 120 may conform to the ISO/IEC 7810ID-1 standard. Furthermore, first card 120 may include embossed card issuer data, information, logos, and card holder information on one or both surfaces. As discussed below, the first card 120 may utilize physically integrated or embedded security features designed to at least partially prevent credit card and identity fraud.

Figure 3:
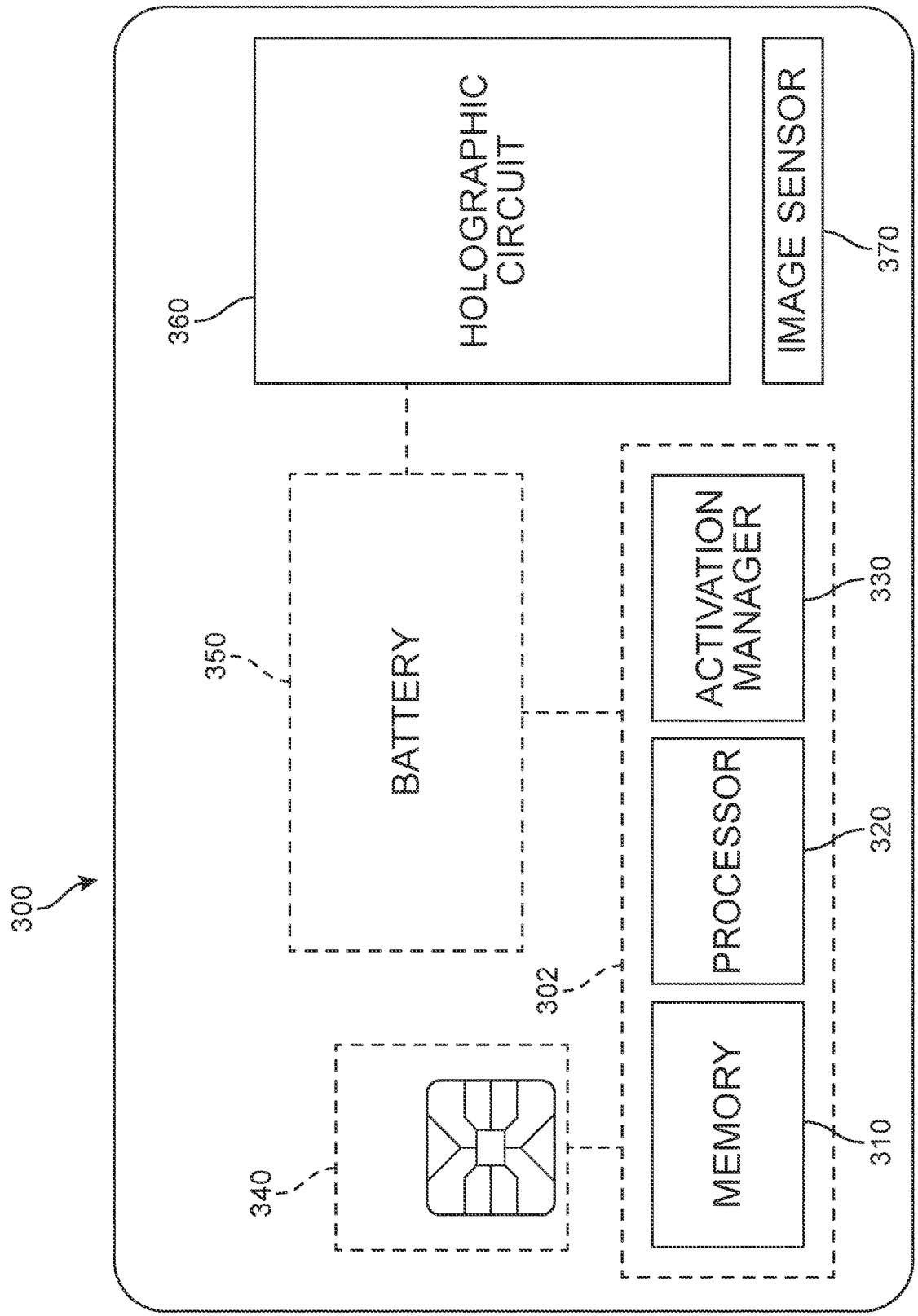
FIG. 3 is an overview depicting some components of a smart card authentication system, according to an embodiment.

As the first user 110 faces first card 120, the first card 120 is configured to detect the presence of the first user's face via a sensor embedded in the first card 120 (see FIG. 3). In FIG. 2, an enlarged view of the input-receiving side 122 of first card 120 is presented. It can be further observed that the first card 120 includes an image 130 of the first user 110. This image 130 is produced using holography, a technique which enables three-dimensional images to be made using a laser, interference, diffraction, light intensity recording and suitable illumination of the recording. The image changes as the position and orientation of the viewing system changes in exactly the same way as if the object were still present, thus making the image appear three-dimensional. It is understood in the art that holographic images are difficult to forge because they are replicated from a master hologram which requires expensive, specialized, and technologically advanced equipment. Furthermore, in some embodiments, the holographic image may be used to store identification and account information about the card holder. Indeed, in some embodiments, the holographic image can serve the same purpose as a magnetic strip on the payment card. Because holographic images are difficult to counterfeit, such a feature significantly increases the security of the card as well as provides a reliable identification mechanism. For example, a holographic image depicting the card holder's face shown on the card offers further evidence that the card holder is actually the authorized user. In addition, as will be discussed herein, the holographic image may be linked to a circuit that is activated only when the user's face matches the face stored on the card. The image of the card holder can be obtained during a card enrollment process, as will be discussed below.

The first card 120 receives the facial image associated with the first user 110 and processes this information. A set of features are extracted that will be matched with one or more feature sets (facial signature models) that had been previously captured and stored in card memory. If a match is detected between the current user's face and a stored facial model, the user's identity will be verified and the card will be authenticated for use. In some embodiments, this authentication causes a holographic-based circuit to 'close' and as a result the card is activated or validated for a short period of time, for example ranging from a few seconds to an hour to a day. In some embodiments, this time period can be preselected by the user to accommodate their security needs. Only within this time period may the card be used. In some embodiments, this can include use of the card during in-person retail shopping experiences, as well as at home or other online shopping experiences. Thus, if the user wishes to make a purchase online, he or she must first activate the card by facial recognition, which will permit the card to be used for the transaction if entered into the website within the period of time in which the card is active. However, if the facial recognition process is unsuccessful and the circuit remains open, the card will remain deactivated and no transactions using the card are possible. In addition, in some embodiments, the first card 120 can be configured to detect aberrations in facial characteristics, such as skin tone, pupil size, etc. to determine whether the authentication is based on a living or conscious person, thereby preventing the use of the card by fraudulent users.

Referring now to FIG. 3, a schematic view of some of the components that may be integrated or incorporated into some embodiments of a smart card are depicted. In different embodiments, a second smart card ("second card") 300 can include a control module 302 comprising a memory 310, a processor 320, and an activation manager 330, as well as an integrated chip and/or RFID chip 340, a power source or battery 350, a circuit 360, and/or an image sensor 370. The control module 302 is configured to communicate with other systems in the card. In some embodiments, the processor 320 can include any type of microprocessor or processors having desired performance characteristics. In addition, the memory 310 may include any type of computer readable medium that stores the facial recognition data, operational software, and control algorithms. In some embodiments, the memory 310 is a storage component that is configured to store multiple facial models and facial recognition algorithms. In one embodiment, the memory 310 is a holographic storage unit. The activation manager 330 determines whether the facial recognition system has been successful and whether and for how long the card should become activated. It should be understood that while the various components and/or subsystems are separately described, each or any of the subsystems may be combined or segregated via hardware and/or software of the system.

Although not depicted here, in some embodiments, the second card 300 may include communication components such as a wireless communication interface such as a wireless LAN (Wi-Fi) interface, cellular network interface, or other communication interface configured to enable communication with external processing systems. Furthermore, in some other embodiments, the second card 300 can include a trigger along the edge of the card or on its front or back surface (not shown in FIG. 3) that can be used to initiate the image capture via image sensor 370, such as a button, tab, pressure sensor, or other mechanical or chemical sensitive interface by which the user can 'request' that the card begin the activation process. This can help ensure that the card is not continuously capturing image data or attempting to activate the card.

In different embodiments, the smart card includes an embedded power source and clock that will be used by the card for processing and transmitting. For example, battery 350 can include, but is not limited to, a battery, fuel cell, solar cell, or other active power source, and/or a passive power source such a device that generates power from movement that are small enough to be accommodated in a standard size smart card. In some embodiments, the battery 350 may be configured to derive power from an external source such as the action of swiping the credit card in the card reader or a placing the card in a chip reader. Battery 350 can be coupled to all components of the smart card that require a power source in order to function. In some embodiments, the battery 350 is rechargeable, whereby power for recharging comes from a source outside the cards that may be transmitted through a contact pad such as a gold pad, on the cards. A power management system on such cards may deliver power to power storing/consuming elements on such cards.

In different embodiments, the image sensor 370 can comprise any miniaturized image sensing device configured to take an image of a person's face, including, but not limited to, video cameras, digital cameras, imaging systems, LIDAR cameras, charge-coupled devices (CCD), complementary metal-oxide-semiconductor (CMOS) image sensors, ntype metal oxide semiconductor (NMOS), flat panel detectors, sCMOS, emCCD, CIS, back-side illuminated sensors, organic sensors, quantum-dot based sensors, any pixel based image recording device, infrared, thermal systems and/or other imaging sensors and combinations thereof. In one embodiment, the image sensor 370 includes image capture hardware that can produce a 3D-point cloud, such as LIDAR cameras, that can be used to create holographic images.

In one embodiment, the image sensor 370 includes a lensless imaging device that does not use a lens or other image modification element to focus the light exposed onto the imaging sensor. In some cases, the image sensor 370 can be covered with a transparent layer that is designed to protect the image sensor from weather, moisture, dust, dirt, debris, physical contact with other objects, etc. The transparent layer may also be described as a coating, cover glass, or a dust cover, and/or a passivation layer. The image sensor 370 does not require a light source such as a flash or a special light source to capture or generate data at the image sensor, and can be used in normal lighting conditions.

Furthermore, the data captured or generated by image sensor 370 may be combined with deep learning to perform functions or operations such as facial recognition. For example, the image data generated by the imaging sensor 116 can be stored in a medium (e.g., memory 310) associated with the image sensor 370, where the medium is capable of storing digital data and can be associated with processor 320 for processing the data. The data may be processed to generate a reconstructed image that is sufficiently detailed to perform facial recognition. In one embodiment, an edge-based analysis would be reliant on the machine-learning model ("facial model") stored in memory on the card. That model would have received training data represented by the user's facial signature. This would enable the machine learning model to give a 'authorized/not authorized' response (prediction) when the user scans their face at the time of use.

This processed data can then be transmitted to the activation manager 330, where the image is matched with the authorized cardholder's image that is stored in memory 320 and trigger a closing of the circuit 360. The facial recognition may utilize geometric techniques that detect and identify distinguishing facial features, such as size, relative size, distances, and angles among recognizable elements, such as eyes, nose, mouth, chin, and the like, and including photometric or statistical approaches that reduce elements (e.g., pixels) or regions of image into values that are compared with templates to identify the extent of variances. Other techniques can include linear discriminate analysis, principal component analysis using Eigen faces, hidden Markov models, elastic bunch graph matching, edge analysis and/or machine learning models. If the match confidence percentage is below a predefined threshold, the card will remain deactivated, and the attempt may be deemed potentially fraudulent and a notification may be generated that includes a current location of the card in embodiments in which the smart card includes a geolocation device or other global positioning technology.

The activation manager 330, in conjunction with processor 310 can then activate the smart card for a pre-determined amount of time by completing the circuit 360 and allowing for power to be transmitted to the system. The activation manager 330 can include or access a timer embedded in the card that has been preset to the desired 'active' time. After this pre-defined time has expired the card sends a deactivate signal. The deactivate signal disables the card by reopening the circuit so the flow of power is interrupted and card transactions can no longer be processed, making the card difficult to counterfeit or be used by an unauthorized user. The activation manager 330 can include or access a power management chip or module, which controls delivery of power to some or all elements on the smart card.

Figure 4A:
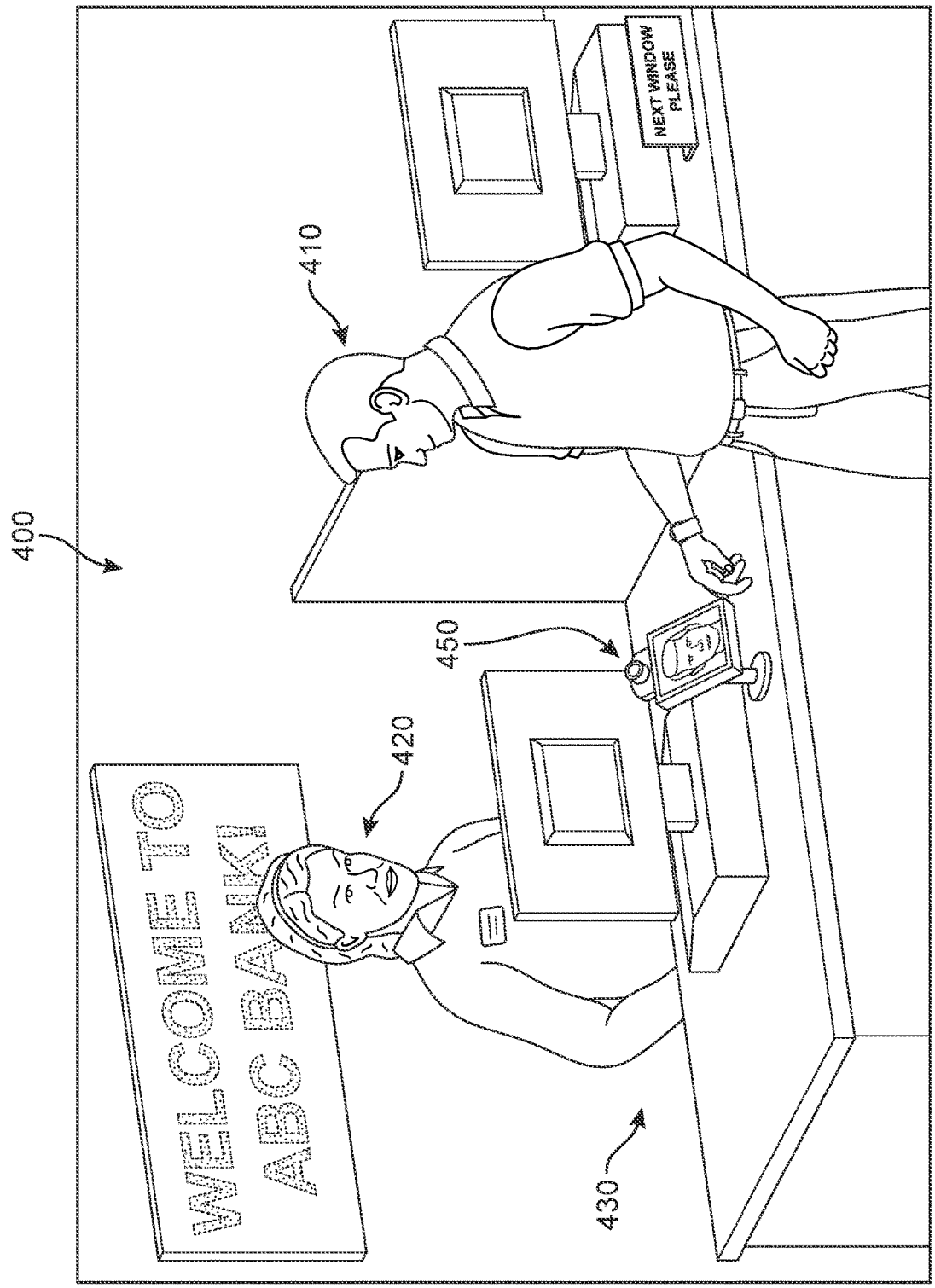
FIGS. 4A and 4B is an example of an enrollment session for a user of a smart card authentication system, according to an embodiment.
Figure 4B:
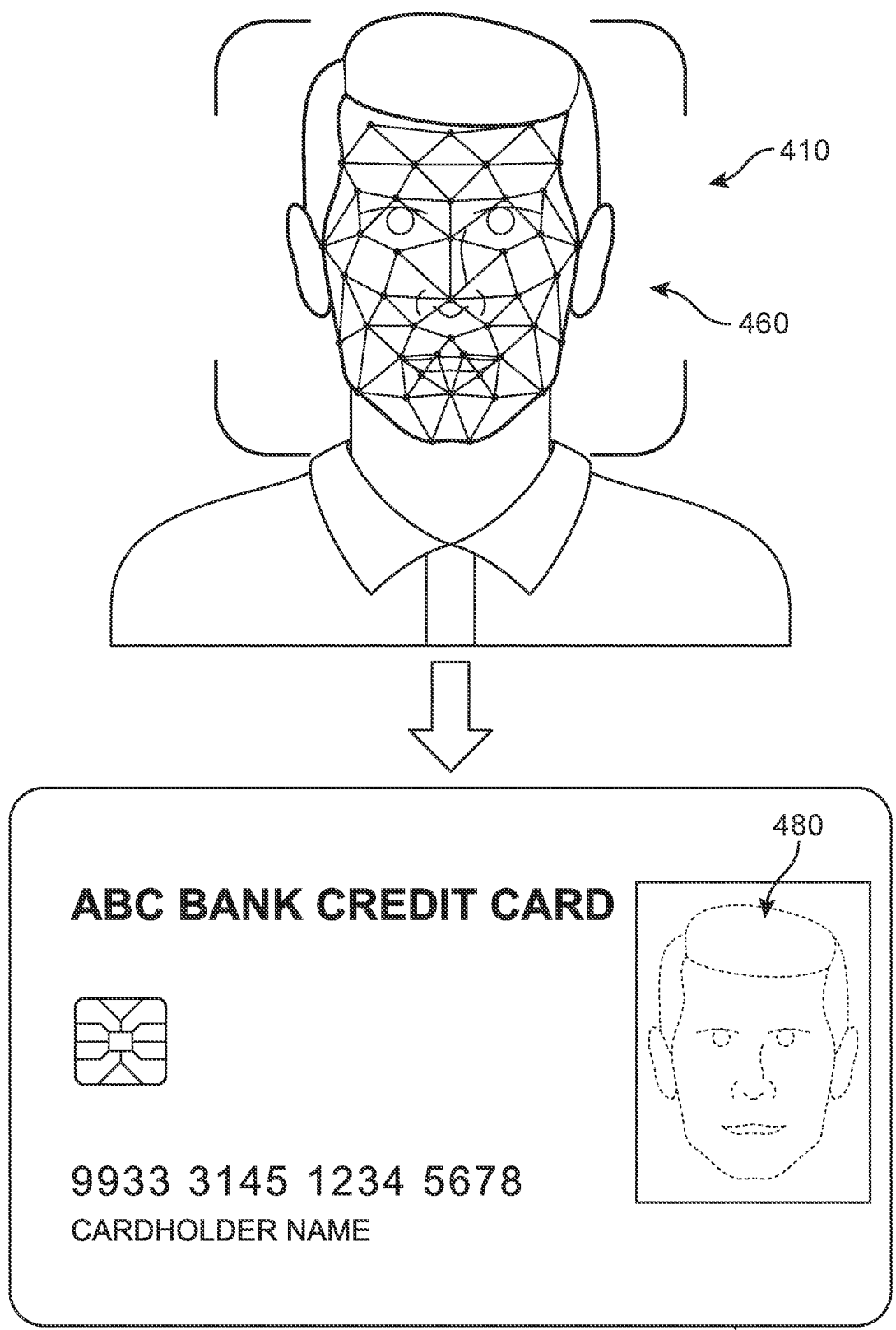

Referring now to FIGS. 4A and 4B, an example of an enrollment or facial signature acquisition session for collection of data and biometric signals that may be used by some of the proposed systems is depicted. In FIG. 4A, two individuals are shown in an environment or space 400 representing a secure location in which the information may be obtained. A third user 410 is meeting with a representative 420 for the smart card service (in this case, a bank). The third user 410 is shown providing his facial image for capture by camera 450. The representative 420 will verify the third user's identity, for example via computing device 430 and other documents or information provided by third user 410. Following the collection of such data, as shown in FIG. 4B, a machine learning model can be trained using the data to generate facial recognition data 460 (also referred to as a facial signature model or facial model) for third user 410 can be stored on a third smart card ("third card") 470. Furthermore, the image obtained can be reproduced as a holographic image 480 that is incorporated into the third card 470 in some embodiments.

Figure 5:
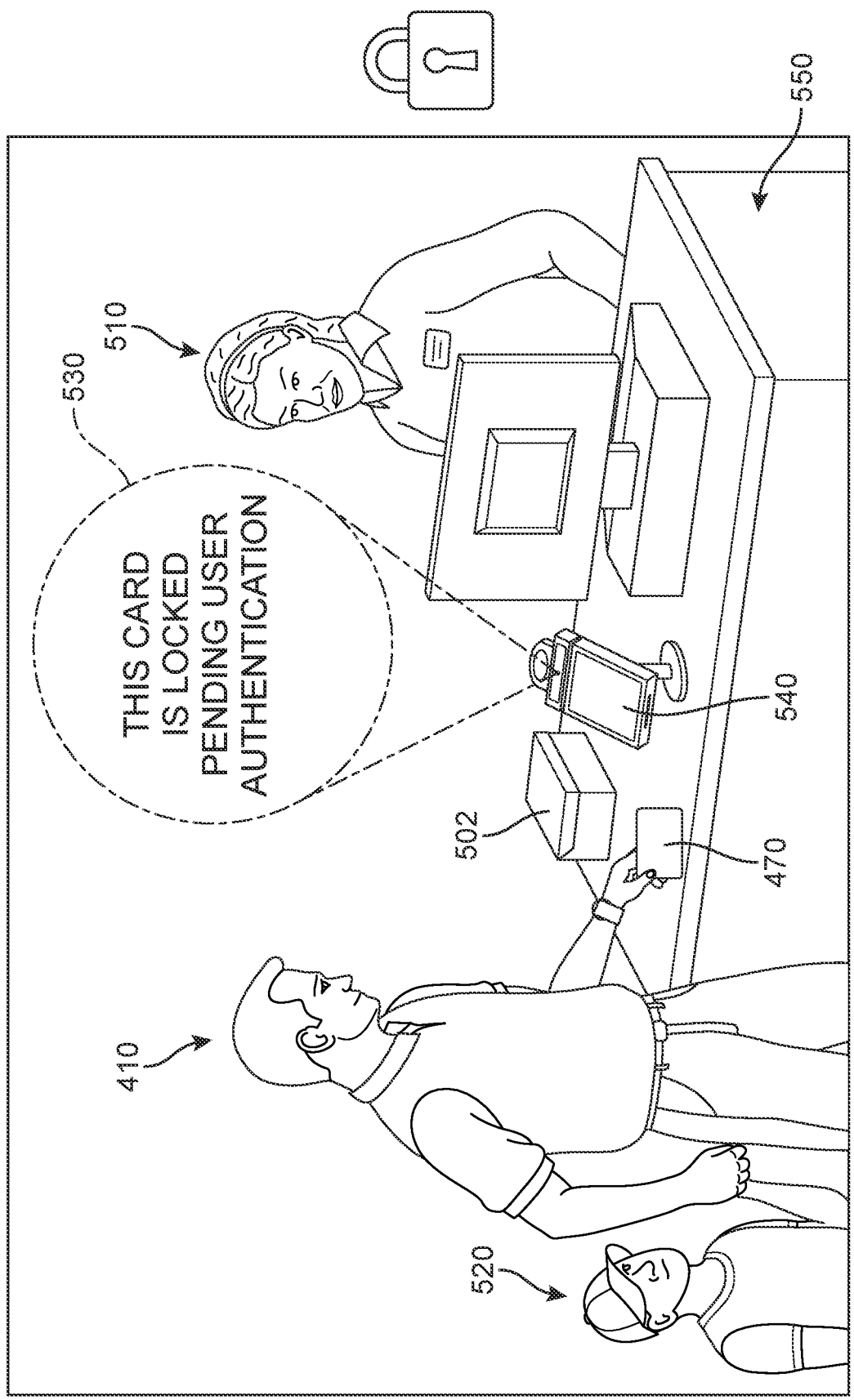
FIG. 5 is an illustration of a person engaged in a retail shopping experience with a disabled smart card, according to an embodiment.

For purposes of illustration, an example of a scenario in which an embodiment of the proposed systems may be implemented is shown with reference to FIGS. 5-9. In FIG. 5, a retail environment ("store") 500 is shown in which customer 410 and his child 520 are shopping. In this case, the customer 410 has moved toward checkout 550 (and toward an optional employee 510) of the store with his desired item 502 (e.g., a pair of shoes). In some embodiments, as shown in FIG. 5, a retail checkout computing device ("retail device") 540 can be provided to facilitate the transaction and notify the customer if there are any issues or flags associated with the customer's account and/or authorization conditions or restrictions. In this case, the customer 410 pulls out his credit card (third card 470), but when he attempts to purchase the item 502, the transaction is shown to be declined via retail device 540.

Figure 6:
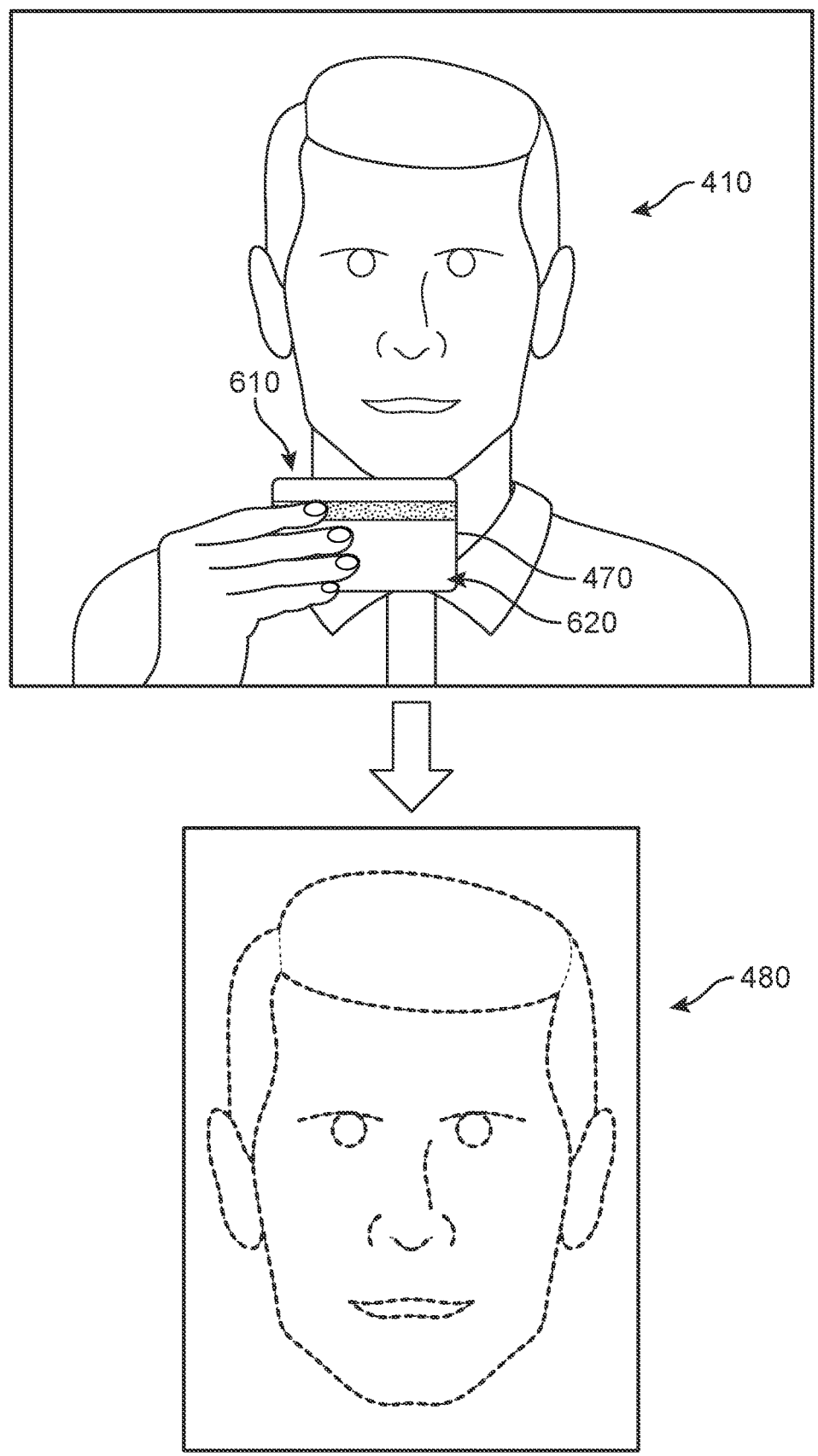
FIG. 6 is an illustration of the person of FIG. 5 initiating the authentication process for his smart card, according to an embodiment.
Figure 7A:
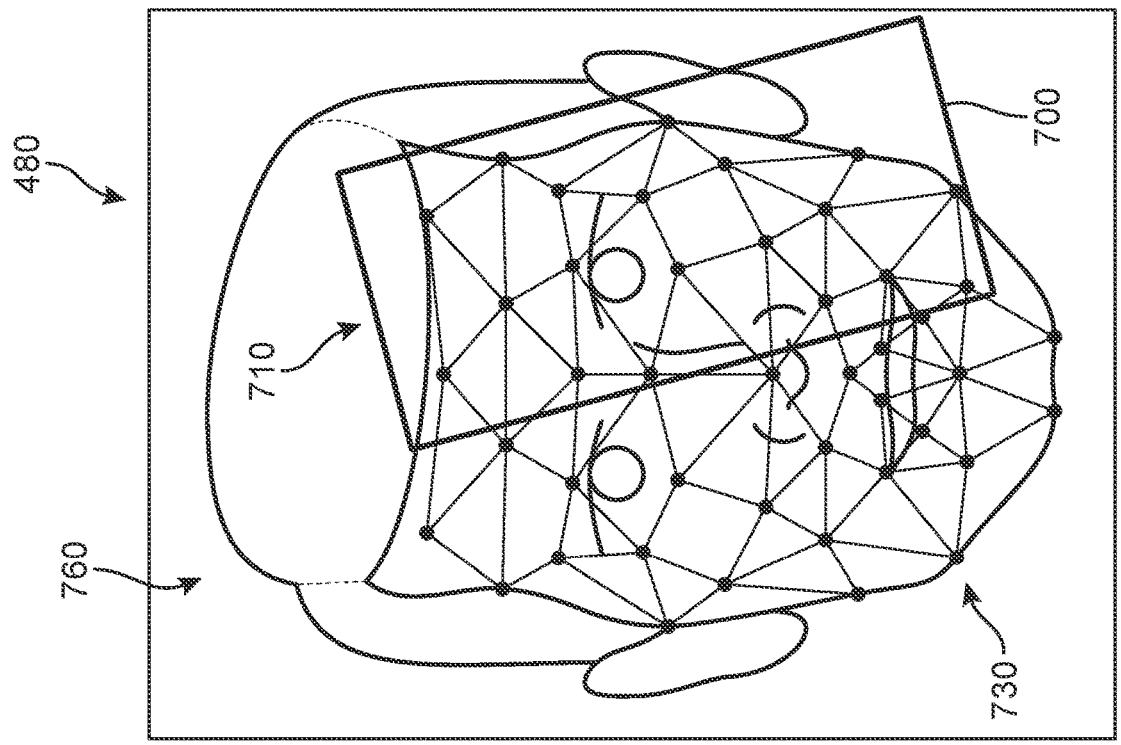
FIGS. 7A and 7B show a sequence in which facial recognition successfully authenticates the user based on a stored facial model, according to an embodiment.
Figure 7B:
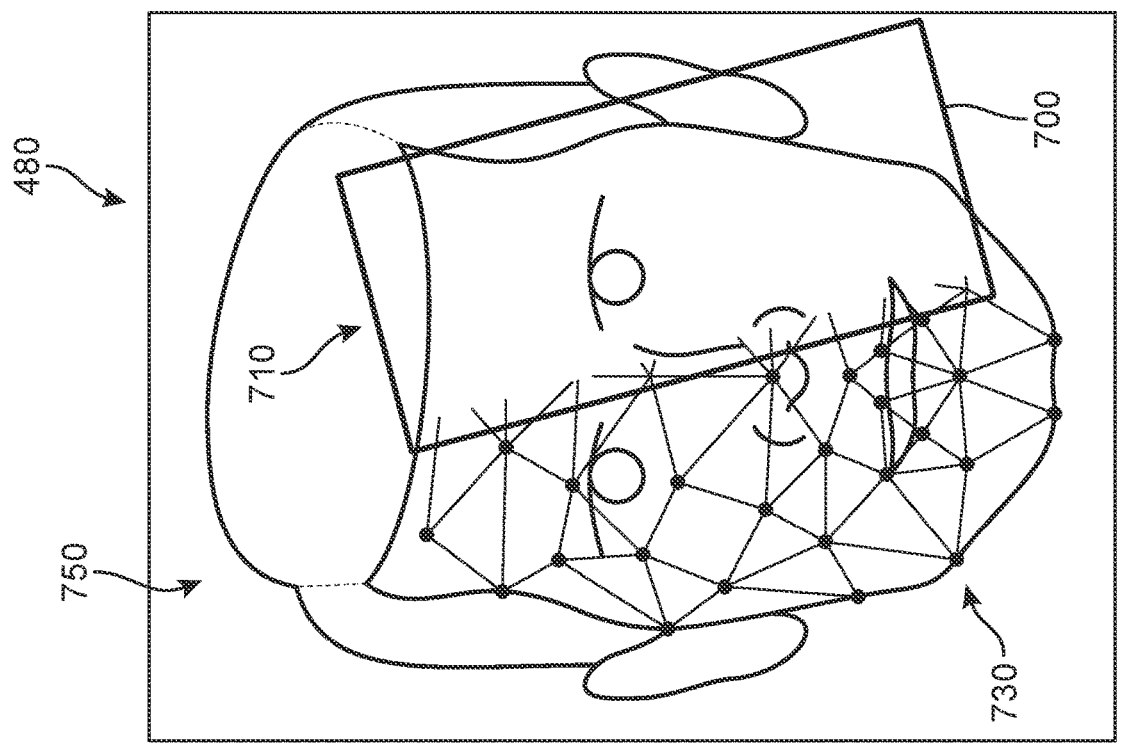
Figure 8:
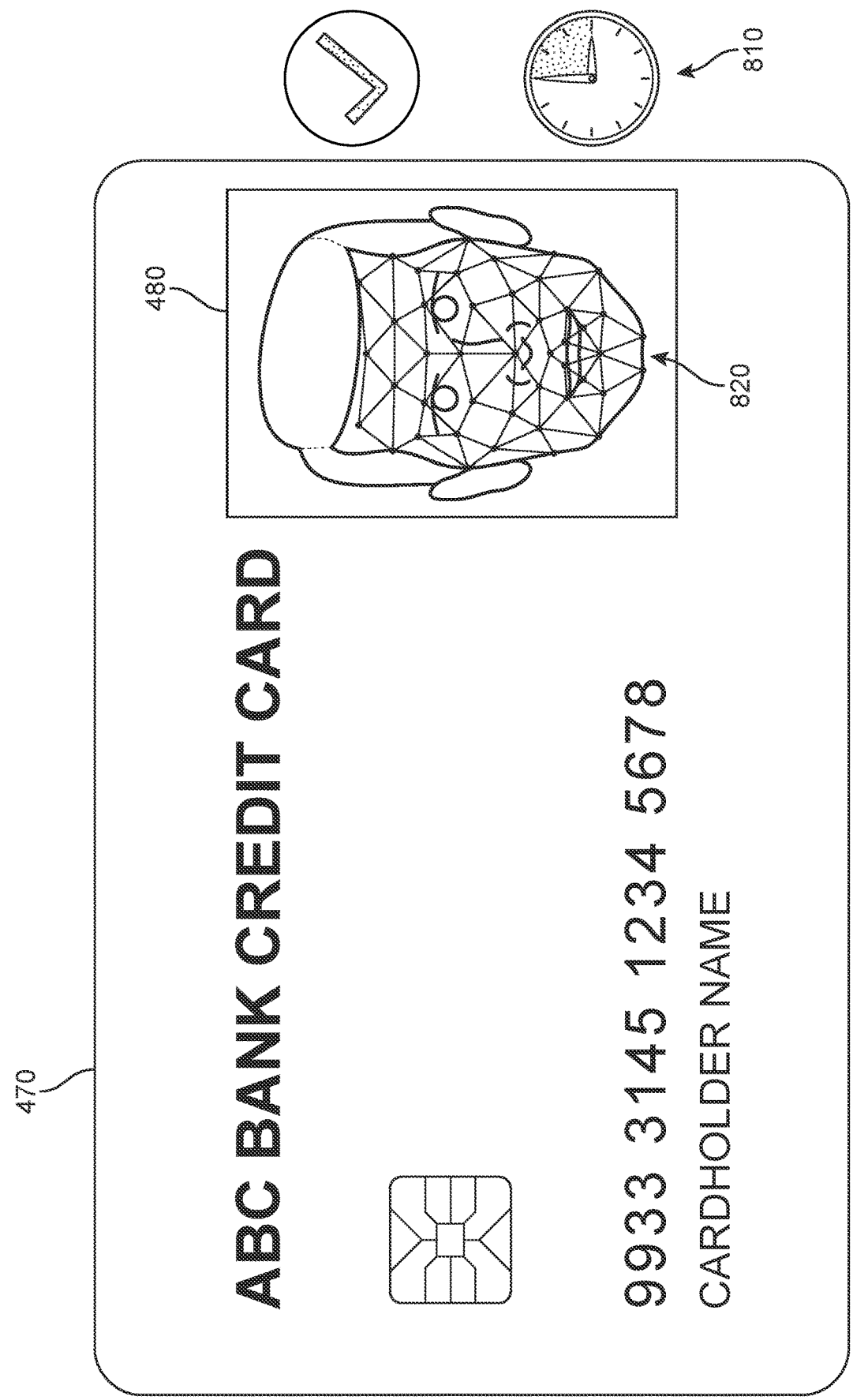
FIG. 8 is an illustration of the smart card being temporarily activated, according to an embodiment.

Realizing the card has not yet been activated, the customer 410 begins the activation process. In FIG. 6, the customer 410 is shown facing a first side 610 of third card 470, where first side 610 (opposite to a second side 620) includes an image sensor and holographic image of some or all of the customer's face. In some embodiments, the customer 410 may press a button or switch a tab to initiate the image capture process. In one embodiment, the holographic image 480 is a window formed on the card representing a redacted hologram of the user's face (in which a segment 700 is missing). The image sensor receives an image 480 which is provided to a control module (see FIG. 3). When the user looks at the window on the card (in a first stage 750 FIG. 7A), a facial recognition algorithm or technique maps the user's face and detects the facial signature 730 associated with the customer. In some embodiments, the user's face "fills in" the hologram, thus completing a circuit (in a second stage 760 of FIG. 7B). As shown in FIG. 8, the third card 470 verifies that the stored facial model (collected during enrollment) matches the received facial signature 820, and the card is activated for a predefined period of time 810.

Figure 9:
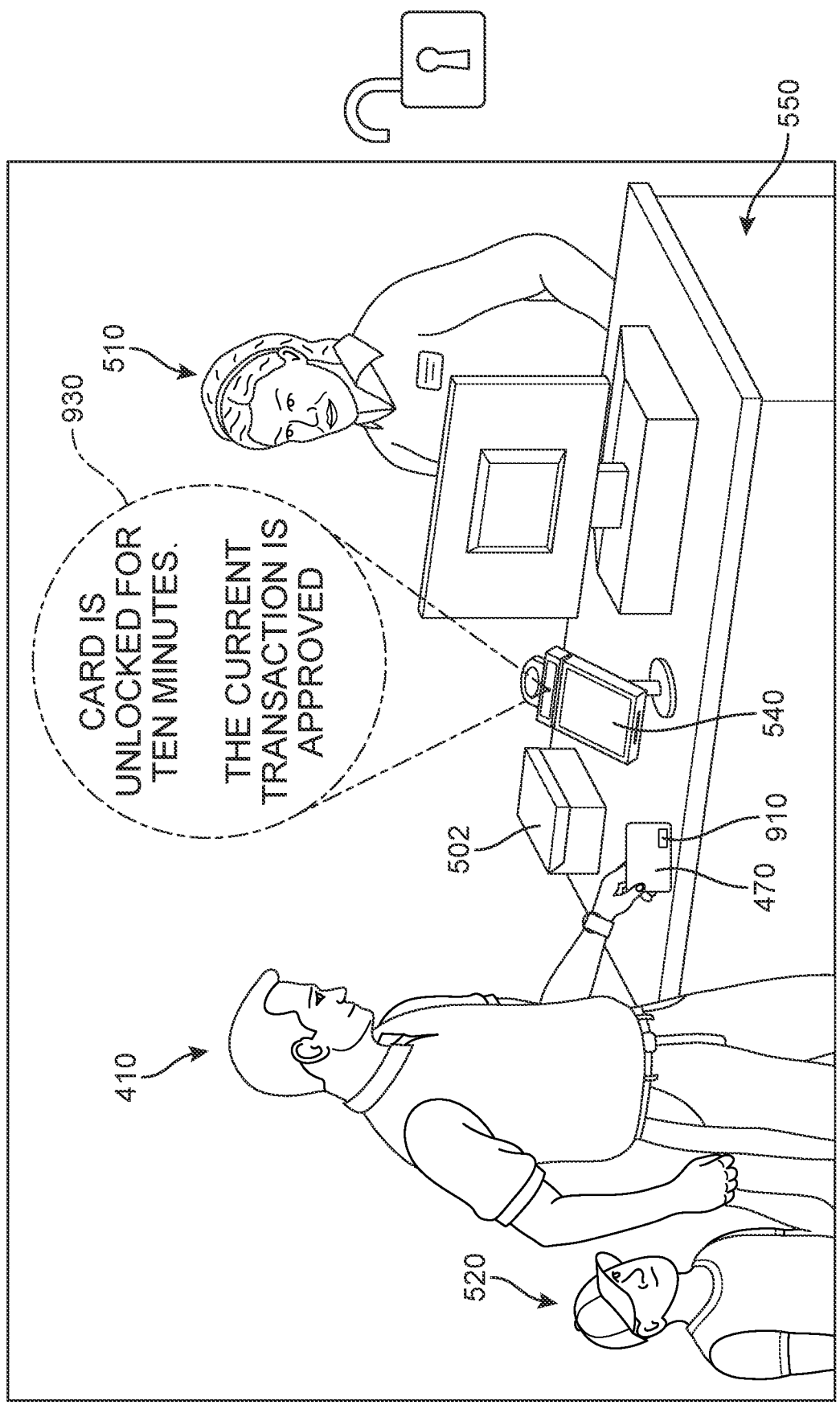
FIG. 9 is an illustration of the person of FIG. 5 having been successfully authenticated and the smart card being used for a retail transaction, according to an embodiment.

Once the third card 480 has been unlocked, it may be used to complete the transaction, as shown in FIG. 9, where a notice 930 ("Car is unlocked for 10 minutes. The current transaction is approved.") confirms the authentication process was successful as well as the fact that, at least for purposes of this example, the customer is permitted to use the third card 470 for ten minutes without needing to re-submit to the authentication process. In one embodiment, the card may include an activation signal 910 such as a change in color or light that visibly indicates that the card is available for use. Thus, without any further requirement for the customer to present any additional authentication factors, such as a fingerprint, pin code, password, ID card, or other factor in some cases, such as where the user is purchasing an item of a particular type or value, the customer is able to proceed with the transaction and be assured of the security of his card. In some embodiments, the card can be configured to display the card number or other secure account information only when the requisite authentication has been verified. In other words, the card may not offer any identifiable information (e.g., cardholder name, account number, etc.) until the card has been activated by the user via facial recognition.

Figure 10:
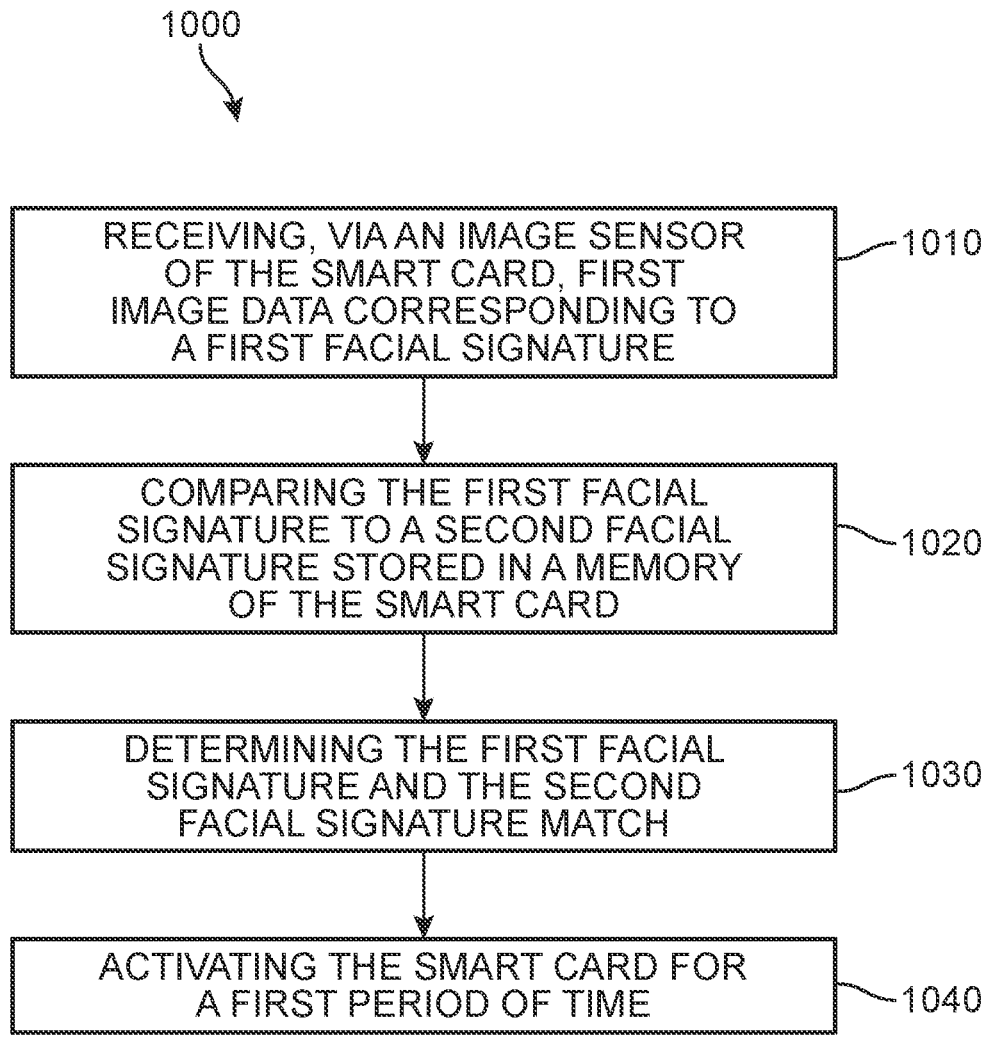
FIG. 10 is a flow chart depicting a process of activating a smart card based on facial recognition, according to an embodiment.

FIG. 10 is a flow chart illustrating an embodiment of a method 1000 of authenticating an identity of an individual in order to activate a smart card for use. The method 1000 includes a first step 1010 of receiving, via an image sensor of the smart card, first image data corresponding to a first facial signature, and a second step 1020 of comparing the first facial signature to a first facial model stored in a memory of the smart card. The method 1000 further includes a third step 1030 of determining the first facial signature and the first facial model match, and a fourth step 1040 of activating, in response to determining the first facial signature and the first facial model match, the smart card for a first period of time.

In other embodiments, the method may include additional steps or aspects. In some embodiments, the method also includes storing, in the memory of the smart card, the first facial model. In another example, the method also includes generating the first facial model during an enrollment session during which the person associated with the first facial model presented identification documents to verify their identity. In some embodiments, the method further includes closing a circuit associated with a holographic image, thereby causing power to flow from a battery of the smart card to a control module of the smart card. In one example, the method also includes opening the circuit, thereby preventing power from flowing from the battery to the control module. In some cases, the method can include deactivating the smart card once the first period of time has passed. In another example, the method includes triggering a switch on the smart card to initiate the image capture.

In one embodiment, the method also includes receiving, via the image sensor, second image data corresponding to a second facial signature, and comparing the second facial signature to the first facial model. The method can also include determining the first facial signature and the first facial model fail to match, and transmitting, in response to determining the second facial signature and the first facial model failed to match, a notification to an external monitoring service via a communication module of the smart card indicating a failed attempt to activate the smart card.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of activating a smart card, the method comprising:
   receiving, first image data for a first user;
   generating a first facial model based on the first image data;
   storing the first facial model in a memory module of the smart card;
   receiving second image data via an image sensor of the smart card;
   detecting a first facial signature in the second image data;
   determining the first facial signature and the first facial model match; and
   activating, in response to determining the first facial signature and the first facial model match, the smart card for a first period of time.

2. The method of claim 1, further comprising generating the first facial model during an enrollment session during which the person associated with the first facial model presented identification documents to verify their identity.

3. The method of claim 1, wherein activating the smart card comprises closing a circuit.

4. The method of claim 3, further comprising causing power to flow from a battery of the smart card to a control module of the smart card by closing the circuit.

5. The method of claim 4, further comprising opening the circuit, thereby preventing power from flowing from the battery to the control module.

6. The method of claim 1, further comprising deactivating the smart card once the first period of time has passed.

7. The method of claim 1, further comprising triggering a switch on the smart card to initiate the image capture.

8. The method of claim 1, further comprising:
   receiving, via the image sensor, third image data corresponding to a second facial signature;
   determining the second facial signature and the first facial model fail to match; and
   transmitting, in response to determining the second facial signature and the first facial model failed to match, a notification to an external monitoring service via a communication module of the smart card indicating a failed attempt to activate the smart card.

9. A system for activating a smart card, the system comprising a processor and non-transitory machine-readable media including instructions which, when executed by the processor, cause the processor to:
receive, first image data for a first user;
generate a first facial model based on the first image data;
store the first facial model in a memory module of the smart card;
receive second image data via an image sensor of the smart card;
detect a first facial signature in the second image data;
determine the first facial signature and the first facial model match; and
activate, in response to determining the first facial signature and the first facial model match, the smart card for a first period of time.

10. The system of claim 9, wherein the instructions further cause the processor to generate the first facial model during an enrollment session during which the person associated with the first facial model presented identification documents to verify their identity.

11. The system of claim 9, wherein activation of the smart card comprises closing of a circuit.

12. The system of claim 11, wherein the instructions further cause the processor to cause power to flow from a battery of the smart card to a control module of the smart card upon closing of the circuit.

13. The system of claim 12, wherein the instructions further cause the processor to open the circuit, thereby preventing power from flowing from the battery to the control module.

14. The system of claim 9, wherein the instructions further cause the processor to deactivate the smart card once the first period of time has passed.

15. The system of claim 9, wherein the instructions further cause the processor to trigger a switch on the smart card to initiate the image capture.

16. The system of claim 9, wherein the instructions further cause the processor to:
receive, via the image sensor, third image data corresponding to a second facial signature;
determine the second facial signature and the first facial model fail to match; and
transmit, in response to determining the second facial signature and the first facial model failed to match, a notification to an external monitoring service via a communication module of the smart card indicating a failed attempt to activate the smart card.

* * * * *